United States Patent [19]

Inoue

[11] Patent Number: 5,195,134
[45] Date of Patent: Mar. 16, 1993

[54] TRANSMITTING, RECEIVING, AND AUTOMATIC RECORDING SYSTEM FOR PROGRAMS WITH TIME AND CHANNEL INFORMATION

[75] Inventor: Hitoshi Inoue, Kanagawa, Japan

[73] Assignee: Sony Corporation, Tokyo, Japan

[21] Appl. No.: 673,528

[22] Filed: Mar. 25, 1991

[30] Foreign Application Priority Data

Mar. 27, 1990 [JP] Japan .................................. 2-77977

[51] Int. Cl.⁵ .......................... H04N 7/167; H04N 7/00
[52] U.S. Cl. ......................................... 380/20; 358/84; 358/142; 358/147; 455/186.1
[58] Field of Search ........................ 358/84, 142, 147; 455/186, 186.1; 380/20

[56] References Cited

U.S. PATENT DOCUMENTS 4,025,851  5/1977  Haselwood et al. .
4,739,510  4/1988  Jeffers et al. ........................ 380/15
4,833,710  5/1989  Hirashima ........................... 380/20
5,016,273  5/1991  Hoff .................................... 380/10

Primary Examiner—Stephen C. Buczinski
Attorney, Agent, or Firm—Hill, Steadman & Simpson

[57] ABSTRACT

Scrambled video and audio signals of programs are transmitted from a transmitting system via a communication satellite to a receiving system. The audio signal contains channel, start/end time, and standard time information of the programs. The receiving system has a calendar for generating time information which is corrected according to the standard time information. Desired programs can automatically be recorded by a video tape recorder connected to the receiving system, based on the channel and start/end time information which is displayed. Any received programs which the user of the receiving system does not want to record can be canceled simply by pushing cancel keys.

8 Claims, 5 Drawing Sheets

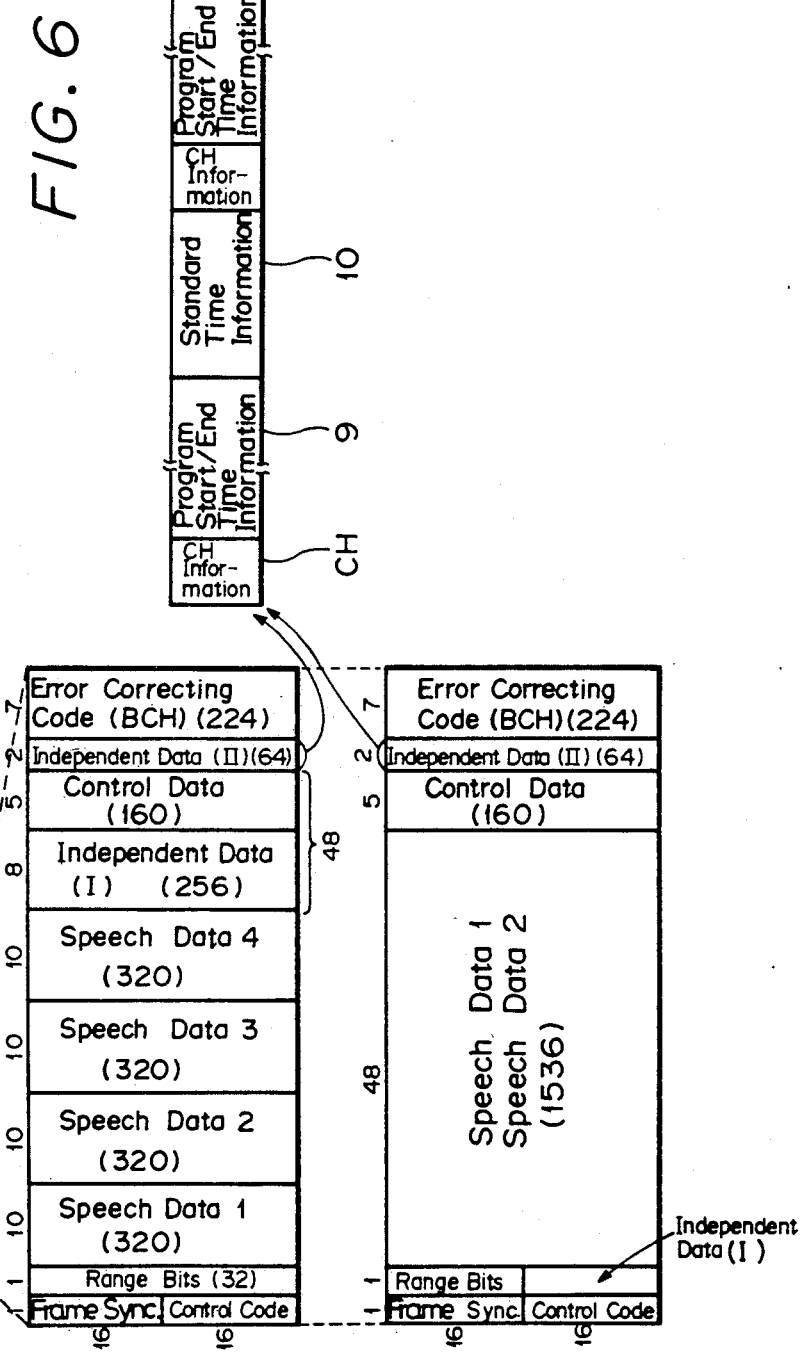

TRANSMITTING, RECEIVING, AND AUTOMATIC RECORDING SYSTEM FOR PROGRAMS WITH TIME AND CHANNEL INFORMATION

BACKGROUND OF THE INVENTION

1. Field of the Invention

The present invention relates to transmitting, receiving, and automatic recording systems for broadcast programs with time and channel information contained in independent data in program signals.

2. Description of the Prior Art

Skyport scramble systems are designed in conformity with or on the basis of the conventional standard satellite broadcasting system. In the skyport scramble systems, video and audio signals to be transmitted are scrambled to provide privacy to the signal transmission service so that only subscribers who pay the charge for the service can receive the transmitted video and audio signals. Typically, the video signals are scrambled by line shuffling, and the audio signals are scrambled by adding quasi-random signals.

Various items of related information are also transmitted together with the video and audio signals in the skyport scramble systems. For example, the items of related information include program information as to transmitted programs, control information for forcibly turning off the descrambling capability of the decoder at a subscriber when the subscription contract expires, individual personal information such as subscriber's contract information and a work key to decipher information ciphers, and message information for additionally displaying information relative to the charged broadcasting service at a receiver.

As shown in FIG. 1 of the accompanying drawings, the items of related information are sent from a skyport administration center 1 to a plurality of scrambling devices 3a, 3b, ... in various regions belonging to an earth station 2, and multiplexed with video and audio signals by the scrambling devices 3a, 3b, ... Then, the multiplexed information is scrambled and transmitted from antennas 4a, 4b, ... to a communication satellite 5, which then transmits the information to a subscriber's receiver 7. The information received by an antenna 6 is descrambled by the receiver 7, and displayed and reproduced by a television set or recorded in a video tape recorder 8 or the like.

The scrambled video and audio signals are descrambled from the related information into normal video and audio signals. To automatically record desired descrambled video and audio signals in the video tape recorder 8 or the like, the video tape recorder 8 should be programmed in advance to record the signals with suitable timer settings. However, no arrangements have been available for automatically recording scrambled programs in the skyport scramble system.

OBJECTS AND SUMMARY OF THE INVENTION

It is an object of the present invention to provide a transmitting system for transmitting the information of a program to a receiving system having a calendar, the transmitting system including means for adding time and channel information to allow the receiving system to program the recording of a desired program with ease.

Another object of the present invention is to provide a receiving system for receiving the transmitted information of a program, the receiving system having means for correcting the time generated by a calendar with standard time information contained in the transmitted information.

Still another object of the present invention is to provide an automatic recording system for automatically recording the transmitted information of programs simply by canceling undesired programs.

According to the present invention, there is provided a transmitting system for transmitting the information of a program to a receiving system having a calendar, comprising means for adding time information indicative of times at which the program starts and ends to the information of the program, and means for adding standard time information to correct the time indicated by the calendar of the receiving system, to the information of the program.

According to the present invention, there is also provided a receiving system for receiving the transmitted information of a program, which contains standard time information, comprising clock means for counting time, and control means for correcting the time counted by the clock means, with the standard time information contained in the transmitted information of the program.

According to the present invention, there is further provided an automatic recording system for automatically recording the transmitted information of programs, comprising receiving means for receiving the transmitted information of the programs, decoding means for decoding the transmitted information of the programs which has been received by the receiving means, selecting means for selecting the information of at least one of the programs from the decoded information of the programs, and recording means for recording the at least one of the programs whose information has been selected by the selecting means.

The above and other objects, features, and advantages of the present invention will become apparent from the following detailed description of an illustrative embodiment thereof to be read in conjunction with the accompanying drawings, in which like reference numerals represent the same or similar objects.

BRIEF DESCRIPTION OF THE DRAWINGS

FIGS. 5A through 5C are diagrams showing the format of frames of a transmitted audio signal; and FIG. 6 is a diagram showing the format of independent data in the frames.

DETAILED DESCRIPTION OF THE PREFERRED EMBODIMENT

First, a transmitting system in a skyport scramble system will be described below with reference to FIG. 4.

Generally, the skyport scramble system provides the paid service of supplying particular audiences or subscribers with video, audio, and digital data via a communication satellite. The video, audio, and digital signals are scrambled and encrypted before being transmitted so that they are secured against compromise to unauthorized audiences who have not signed subscriber's contracts. The scrambled and encrypted data can be descrambled and decrypted only by subscriber's receivers or descramblers.

The skyport scramble system is essentially composed of the following elements:

(i) Skyport administration center:

The skyport administration center does various administrative works handling customers or subscribers, i.e., accepts applications for subscription contracts, makes, modifies, and cancels subscription contracts, charges subscribers, and supervises subscriber's data.

(ii) Earth station:

Based on subscriber's data sent from the skyport administration center, the earth station scrambles and encrypts signals to be transmitted, modulates carriers with the scrambled and encrypted signals, and transmits the resultant wave to a communication satellite.

(iii) Communication satellite:

The communication satellite relays the wave from the earth station back to the earth.

(iv) Subscribers:

The subscribers have a receiver for receiving the wave transmitted from the communication satellite and a descrambler for restoring the transmitted signals. The subscribers can enjoy charged information which has been received.

Figure 1:
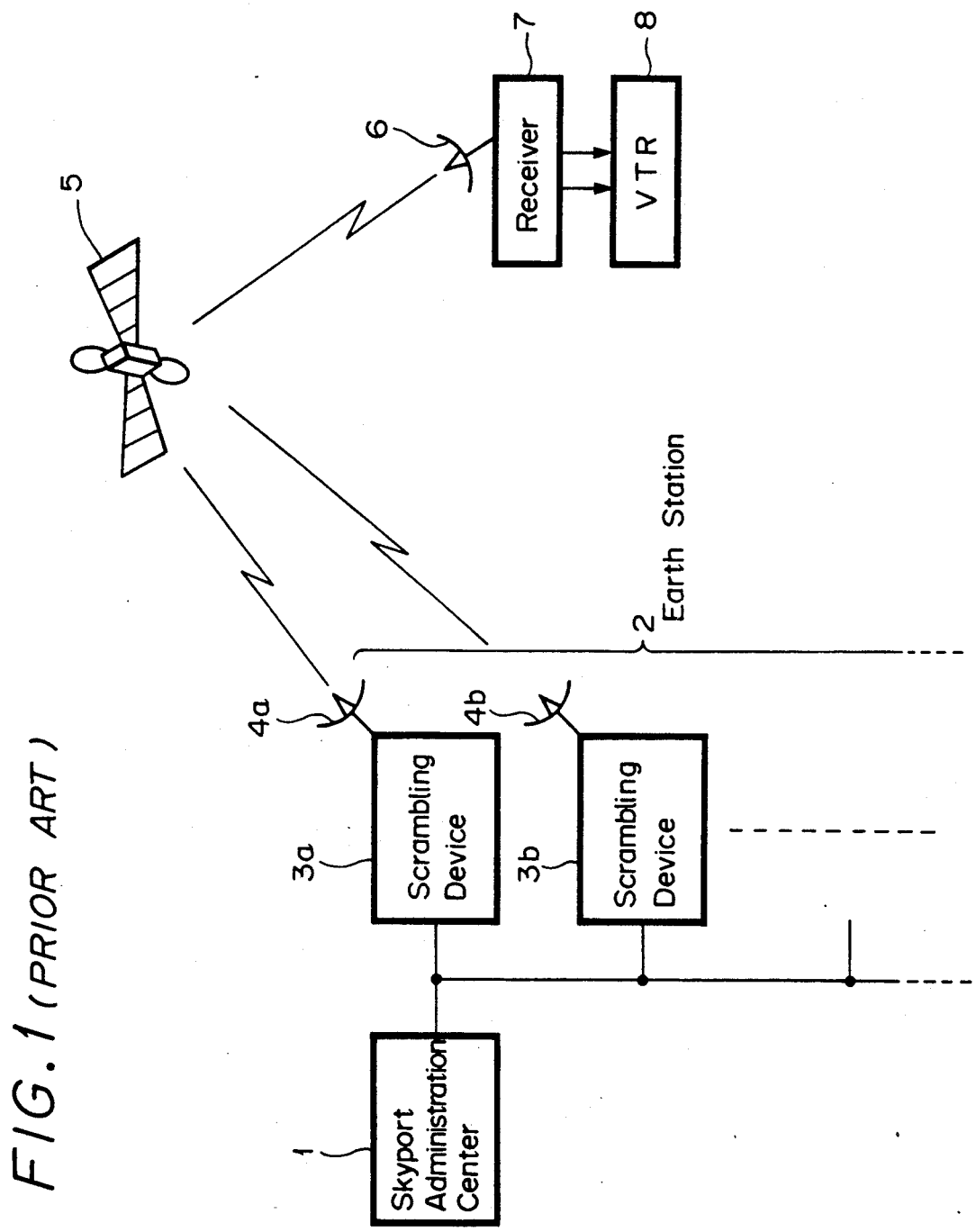
FIG. 1 is a block diagram of a conventional transmitting system.
Figure 4:
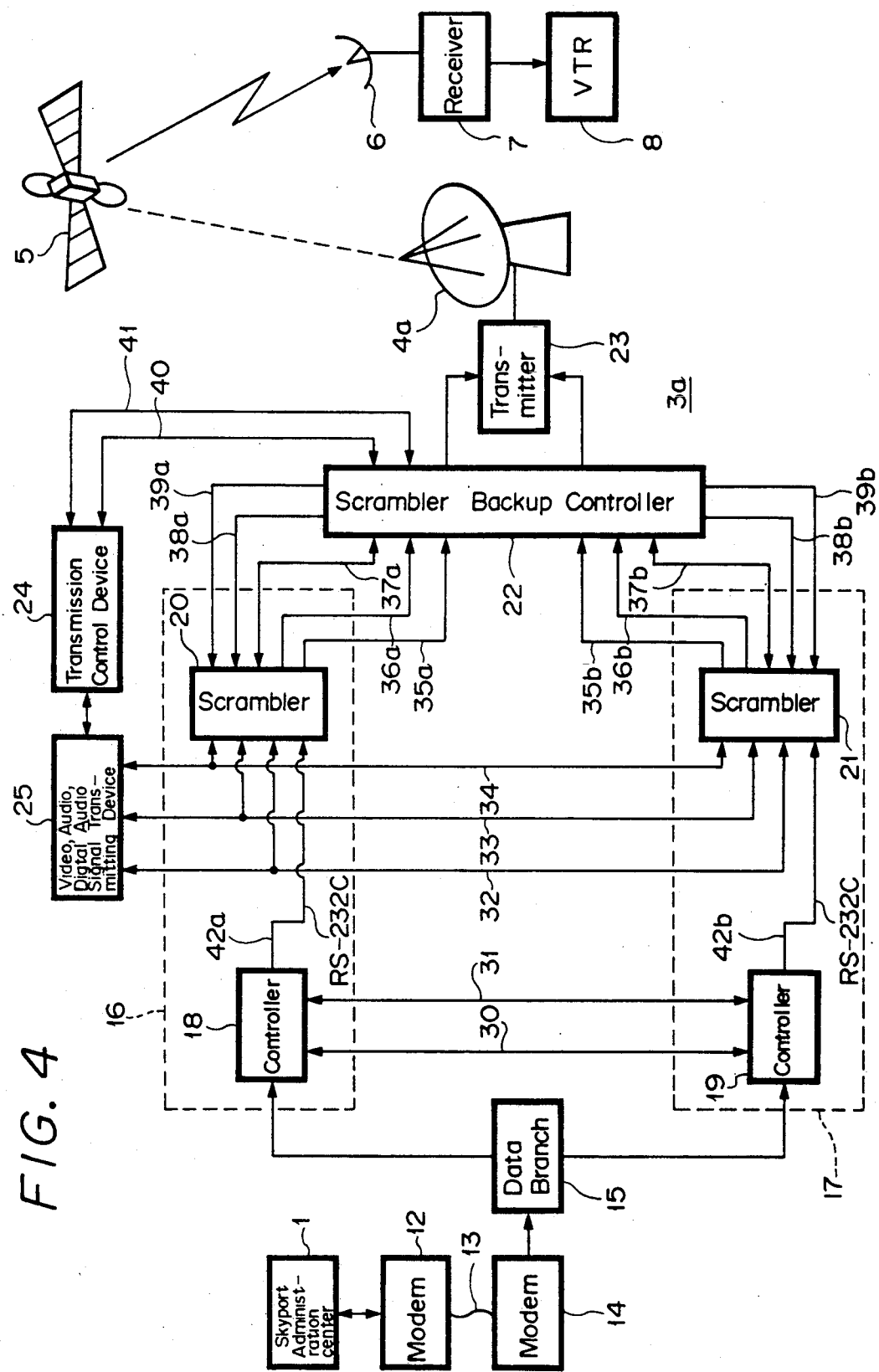
FIG. 4 is a block diagram of a transmitting system according to the present invention.

The skyport administration center, denoted at 1 in FIG. 4, is located in the earth center, and has a host computer (CPU) which transmits various items of related information such as subscriber's data and command data through a modem 12 and a dedicated line 13 to a modem 14 The transmitted items of related information are then sent to a data branch 15, from which they are supplied simultaneously to a first control system 16 serving as an active system and a second control system 17 serving as an auxiliary system. The first and second control systems 16, 17 jointly constitute the scrambling device 3a shown in FIG. 1. Exchange of data is however carried out only between the CPU in the skyport administration center 1 and the active first control system 16.

The first and second control systems 16, 17 have respective controllers 18, 19 and respective scramblers 20, 21. The controllers 18, 19 are of identical construction and have respective hard disks (not shown) which store subscriber's data such as ID number control data. The scramblers 20, 21 are also identical in construction, and are supplied with a video signal 32 and left- and right-channel audio signals 33, 34 from a video, audio, and digital audio signal transmission device 25 which is controlled by a transmission control device 24. Mode/control data 40 and digital data 41 are exchanged between the transmission control device 24 and a scrambler backup controller 22. Data are exchanged between the controllers 18, 19 and the scramblers 20, 21 through RS-232C interfaces 42a, 42b, and also between the controllers 18, 19 through an RS-232C interface 30 and an Ethernet cable 31. TCP/IP is used a set of communications protocols, with the controllers 18, 19 being TCP/IP terminals.

The scramblers 20, 21 of the first and second control systems 16, 17 supply scrambled and encrypted video signals 36a, 36b, subcarriers 35a, 35b, and beam stream signals to the scrambler backup controller 22. The scrambler backup controller 22 supplies the scramblers 20, 21 with digital data 37a, 37b, mode data 38a, 38b, and status check data 39a, 39b. The digital data 37a, 37b are serial data of 64 kBPS or 256 kBPS, for example, which are supplied to the scramblers 20, 21 in timed relation to clock and frame sync signals. The video signal 32 which is transmitted from the video, audio, and digital audio signal transmission device 25 to the scramblers 20, 21 is of NTSC format, and scrambled by line shuffling, using a frame memory. The audio signals 33, 34 may be input in four channels at maximum, and are pulse-code-modulated according to the input mode thereof and then scrambled.

The service data from the skyport administration center 1 are supplied to the scrambler 20 through the controllers 18, 19 and the RS-232C interfaces 42a, 42b. The ID number control data are composed of authorization data indicating which of video, audio, and digital data each subscriber can receive, and a message flag. The ID number control data are supplied from the skyport administration center 1 and stored in the hard disks in the controllers 18, 19 and memories in the scramblers 20, 21. If the ID number control data are modified, only modified data are transmitted from the skyport administration center 1, updating the contents of the hard disks in the controllers 18, 19 and the contents of the memories in the scramblers 20, 21.

The pulse-code-modulated digital audio data, the digital data 37a, 37b, the service data, and the ID number control data are combined into a bit stream signal with a header added according to a predetermined format. The bit stream signal is then supplied as a four-phase DPSK (differential phase shift keying signal from each of the scramblers 20, 21. These output signals from the scramblers 20, 21 are transmitted through the scrambler backup controller 22 to a transmitter 23, which transmits the signals through an antenna 4a to a communication satellite 5. The communication satellite 5 transmits charged scrambled data to subscribers. The scrambled data are received by the receiver 7 of each subscriber through an antenna 6. The received data are descrambled, and displayed and reproduced by a television set or recorded in a video tape recorder 8 or the like.

The video signal 32 sent from the video, audio, and digital audio signal transmission device 24 is frequency-modulated and then converted by the scrambling device into an SHF wave, which is then transmitted to the communication satellite 5. The audio signals 33, 34 are pulse-code-moduated into digital signals, which then modulate audio subcarriers with PSK (Phase Shift Keying).

Each of the audio signals has frames as shown in FIGS. 5A through 5C. The audio signal is composed of frames each of 2048 bits, and 1000 frames are transmitted per second. As shown in FIG. 5A, data comprising 2048 megabits which correspond to a frame range of from a frame 1 to a frame 1000 are delivered per second. The frame 1 for the A mode is shown at an enlarged scale in FIG. 5B has a frame synchronization signal of 16 bits which allows a bit clock signal to be reproduced with ease in the receiver. Next 16 bits following the frame synchronization signal are indicative of a transmission mode which causes the receiver to select a corresponding reception mode. The frame 1 also has 32 range bits divided into four groups of 8 bits, which correspond respectively to speech data 1 through 4.

Each 8-bit group has first 3 bits serving as range bits corresponding to a range number, next 4 bits as error correcting bits for the range bits, and a final 1 bit of "0". The frame 1 for the B mode has no speech data 3, 4 as shown in FIG. 5C. For the B mode, the 16 range bits which would otherwise correspond to the speed data 3, 4 are used as bits for transmitting independent data (I). For the A mode, the speech data 1 through 4 are each composed of 320 bits. For the B mode, the speech data 1, 2 are composed of 1536 bits altogether. The independent data are data which can freely be utilized by the subscriber, and have 480 bits for the A mode and 224 bits for the B mode. Of these independent data, independent data (I) of 256 bits (16 bits for the B mode) and control data of 160 bits have already been used in the scrambler, and independent data (II) of 64 bits can freely be utilized by the subscriber. Therefore, 64 bits × 1000 frames can freely be utilized per second by the subscriber. For the B mode, the independent data (II) can also freely be utilized in the same way. Final 224 bits of the frame 1 make up an error correcting code which is added to the speech data or the independent data.

In the illustrated embodiment, the independent data (II) composed of 64 kBPS per second are used in a data format as shown in FIG. 6. In FIG. 6, the independent data include channel (CH) information indicative of a channel, program start/end time information 9 indicative of times at which a next program starts and ends, and standard time information 10 for correcting a timer in the receiving system which has a clock function. When a present program is finished, the program start/end time information 9 is updated with new program start/end time information. The program start/end time information 9 in the audio signal is transmitted at all times with respect to programs for two days. The receiving system to which the above items of information are transmitted is always kept in a reception mode with respect to contracted channels.

Figures 2A, 2B:
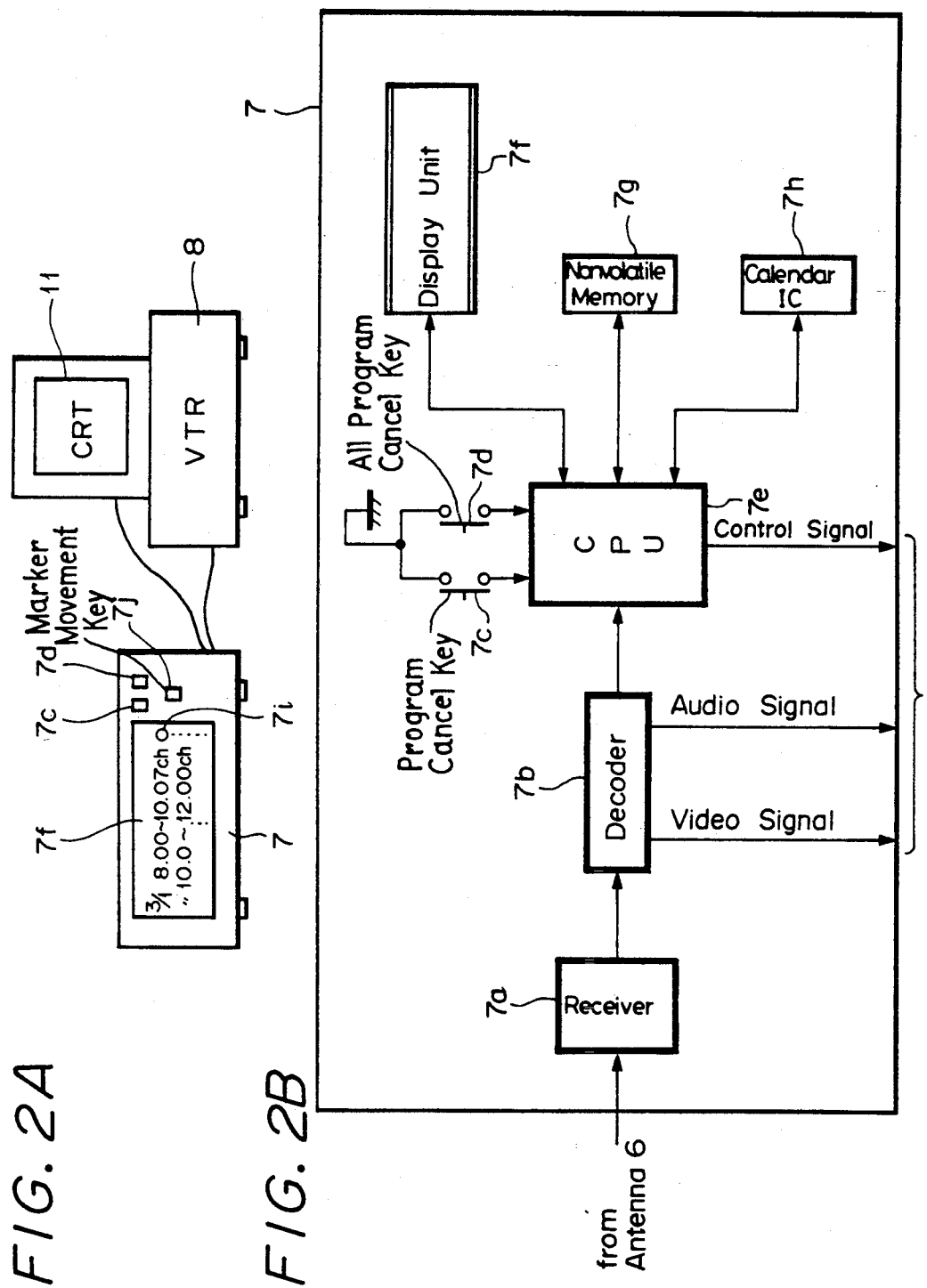
FIG. 2A is a front elevational view of a receiving system according to the present invention.
FIG. 2B is a block diagram of the receiving system shown in FIG. 2A.
Figure 3:
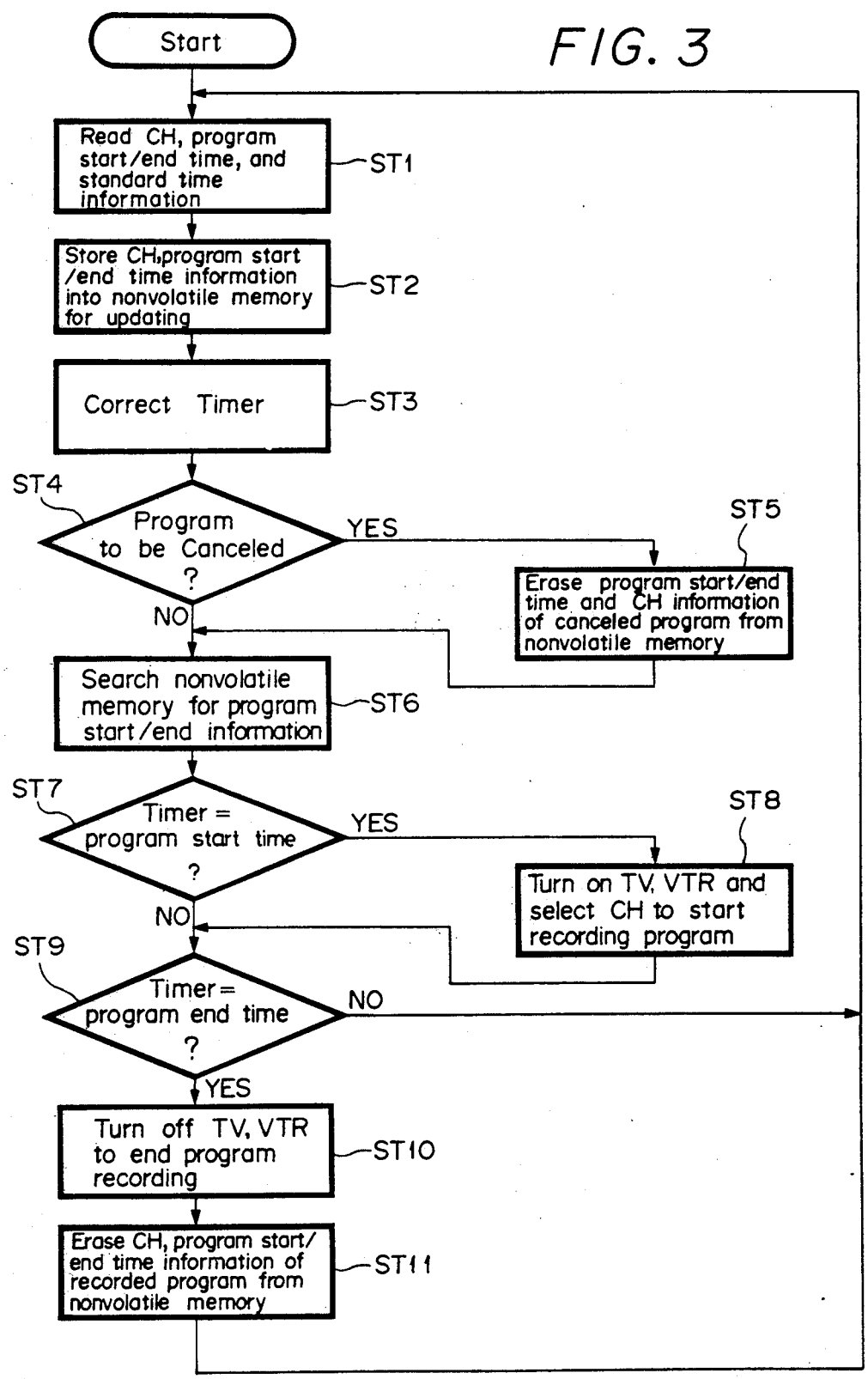
FIG. 3 is a flowchart of an operation sequence of the receiving system shown in FIG. 2B.

The scrambled video and audio signals and other information are received by a receiving system as shown in FIGS. 2A and 2B. As shown in FIG. 2B, the receiving system includes a receiver 7a for receiving the scrambled signals and information from the antenna 6, a decoder 7b for descrambling and decoding the video and audio signals received by the receiver 7a, a microcomputer (CPU) 7e, a nonvolatile memory 7g for storing program information, a calendar IC 7h for generating signals indicative of year, month, date, and time, a first cancel key 7c for canceling a program, a second cancel key 7d for canceling all selected programs simultaneously, and a display unit 7f for displaying time and program information. As shown in FIG. 2A, the receiving system is connected to apply output signals to a VTR 8 or a television set 11 or both.

While the receiving system is held in the reception mode to receive contracted channels, the channel information CH, the program start/end time information 9, and the standard time information 10 as shown in FIG. 6, which are transmitted from the transmitting system, are read into the nonvolatile memory 7g, and programs in the respective channels for two days are successively displayed on the display unit 7f as shown in FIG. 2A. The subscriber looks at program columns in a newspaper or the like, and determines whether the program on channel 7 from 8:00 to 10:00 on March 1 should be recorded or not. If the program is not to be recorded, then the subscriber may push a marker movement key 7j on a front panel of the receiving system. Then, a marker 7i on the display unit 7f moves from the program column indicating the program on channel 7 from 8:00 to 10:00 on March 1 to the next program column indicating the program on channel 1 from 10:00 to 12:00 on March 1. If this program is not to be recorded, then the subscriber may push the first cancel key 7c, whereupon the program column is canceled. The subscriber similarly operates on the receiving system for the programs displayed on the display unit 7f. The second cancel key 7d is used simultaneously to cancel all the programs displayed on the display unit 7f. Only the program information relative to those programs which are canceled by the first cancel key 7c is erased from the nonvolatile memory 7g.

Operation of the receiving system shown in FIGS. 2A and 2B will be described below with reference to the flow-chart of FIG. 2. First, the channel information CH, the program start/end time information 9, and the standard time information 10 are read in a step ST1, and then stored in the nonvolatile memory 7g, updating any old information stored therein, in a step ST2. In a step ST3, the CPU 7e compares the year, month, date, and time generated by the calendar IC 7h with the received standard time information 10, and corrects the generated time information into conformity with the received standard time information if there is any difference. Then, the CPU 7e determines in a step ST4 whether the first cancel key 7c or the second cancel key 7d is pushed or not, i.e., whether any program is canceled or not. If any program is canceled, control goes to a step ST5 in which the CPU 7e erases the program start/end time information 9 and the channel information CH of the canceled program from the nonvolatile memory 7g. Then, control proceeds to a step ST6. If no program is canceled in the step ST4, then control goes directly from the step ST4 to the step ST6.

In the step ST6, the CPU 7e searches the nonvolatile memory 7g for the times at which a program starts and ends. Then, the CPU 7g determines in a step ST7 whether the time count of a timer of its own has reached the program start time. If the program start time has been reached, then the CPU 7e applies a control signal to the television set 11 and the VTR 8 to turn on their power supplies, and selects the corresponding channel of the program, so that the program can be recorded, in a step ST8. If the program start time has not been reached or after the step ST8, the CPU 7e determines in a step ST9 whether the time count of the timer has reached the program end time. If the program end time has been reached, then CPU 7e applies a control signal to the television set 11 and the VTR 8 to turn off their power supplies, thus completing the program recording process, in a step ST10. Thereafter, the channel information CH, the program start/end time information 9, and the standard time information 10 of the recorded program are erased from the nonvolatile memory 7g in a step ST11. Then, control returns to the step ST1. Control also returns to the step ST1 if the program end time has not been reached in the step ST9.

With the arrangement of the present invention, any desired programs can be selected for programmed recording simply by pushing the cancel keys to delete undesired programs from the recording list. The illustrated system is directed to automatic recording of desired broadcast programs. However, the principles of the present invention are also applicable to an automatic telephone answering set. The transmitting system of the skyport scramble system utilizes the independent data of the audio signal for sending time and channel information necessary to automatically record desired programs, and also for sending standard time information to correct time information generated by the calendar in the receiving system. Since the time information in the receiving system is corrected at all times according to the standard time information, desired programs can always be recorded in accurate time intervals.

Although a certain preferred embodiment has been shown and described, it should be understood that many changes and modifications may be made therein without departing from the scope of the appended claims.

I claim as my invention:

1. A transmitting system, comprising:
   means for transmitting video program information to a receiver system having a calendar;
   means for adding time information indicative of times at which a program starts and ends to said program information;
   means for adding standard time information to the program information to correct a time indicated by the calendar of the receiving system; and
   said means for transmitting comprising a first active control system and a second auxiliary control system, each of said first and second control systems having their own controller controlling their own scrambler means, each of said scrambler means scrambling the video program information and the added time information and standard time information.

2. A system according to claim 1 wherein a scrambler back-up controller connects to both the first and second control systems and has its output connected to a transmitter.

3. A system according to claim 1 wherein a data branch means is provided for simultaneously supplying control information data to both said first and second control systems.

4. A transmitting system according to claim 1 further comprising means for adding channel information indicative of the channel on which the program is transmitted to the program information.

5. A transmitting system according to claim 1 wherein the program information includes video and audio signals, and means is provided for adding the added information to the program audio signal.

6. A transmitting system according to claim 5 wherein the added information is in a data block having program audio signal data and the sequence of channel information, program start/end time information, and standard time information.

7. A transmitting system according to claim 5 wherein said added information is added subsequent to speech data in data blocks of the audio signal.

8. An automatic recording system for automatically recording a transmitted program on a designated channel at a designated time, comprising:
   television receiving means for descrambling video and audio signals and for receiving transmitted program information transmitted along with said video and audio signals relating to a plurality of programs, said program information including program identification, channel information, program start/end time information, and standard time information;
   decoding means for decoding the transmitted program information received by said receiving means;
   non-volatile memory means for storing said program information for said plurality of programs;
   calendar means including timing means for providing current date and time information;
   a display means for displaying program information for a plurality of said programs;
   control means connected to said calendar means, memory means, and display means for calibrating said calendar means with said standard time information, for selecting program information for a plurality of programs from said memory means and displaying said plurality of programs on said display means, and for permitting said recording means to record at least one of said programs which has been selected for recording;
   said control means including marker movement key means for placing a marker adjacent any one of the program informations for said plurality of programs which are displayed on the display means;
   a first cancel key means connected to said control means for instructing said control means to cancel a particular program at which the marker is adjacent;
   second cancel key means for instructing said control means to cancel a plurality of programs at a same time; and
   said first cancel key means being located as a separate key on a front panel of said display means adjacent a screen of said display means so that an operator can observe the position of the marker and conveniently press the cancel key means when desired to cancel the particular program indicated by the marker.

* * * * *